United States Patent
Cho et al.

(10) Patent No.: US 10,122,540 B2
(45) Date of Patent: Nov. 6, 2018

(54) DEVICE AND METHOD FOR MANAGING MULTICAST GROUP IN WIRELESS NETWORK

(71) Applicant: Chung-Ang University-Academy Cooperation Foundation, Seoul (KR)

(72) Inventors: Sung Rae Cho, Seoul (KR); Jun Beom Hur, Yongin-si (KR); Woong Soo Na, Osan-si (KR); Jeong Seok Yu, Uiwang-si (KR); Tae Jin Kim, Seoul (KR); Hyoung Chel Bae, Seoul (KR); Yun Seong Lee, Seoul (KR); Ju Ho Lee, Seoul (KR); Zeynep Vatandas, Seoul (KR)

(73) Assignee: CHUNG-ANG UNIVERSITY-ACADEMY COOPERATION FOUNDATION, Seoul (KR)

( * ) Notice: Subject to any disclaimer, the term of this patent is extended or adjusted under 35 U.S.C. 154(b) by 339 days.

(21) Appl. No.: 14/947,402

(22) Filed: Nov. 20, 2015

(65) Prior Publication Data
US 2016/0080161 A1  Mar. 17, 2016

Related U.S. Application Data

(63) Continuation of application No. PCT/KR2014/004052, filed on May 7, 2014.

(30) Foreign Application Priority Data

May 30, 2013  (KR) .................. 10-2013-0062149
May 30, 2013  (KR) .................. 10-2013-0062152
May 7, 2014   (KR) .................. 10-2014-0054453

(51) Int. Cl.
*H04L 12/18* (2006.01)
*H04W 4/06* (2009.01)

(52) U.S. Cl.
CPC .......... *H04L 12/185* (2013.01); *H04L 12/189* (2013.01); *H04W 4/06* (2013.01)

(58) Field of Classification Search
None
See application file for complete search history.

(56) References Cited

U.S. PATENT DOCUMENTS

| | | | | |
|---|---|---|---|---|
| 6,141,785 A | * | 10/2000 | Hur | H04L 1/18 |
| | | | | 714/18 |
| 2008/0186895 A1 | * | 8/2008 | Shang | H04L 29/06 |
| | | | | 370/312 |
| 2012/0066396 A1 | | 3/2012 | Kang et al. | |

FOREIGN PATENT DOCUMENTS

| | | |
|---|---|---|
| KR | 10-0349420 B1 | 8/2002 |
| KR | 10-0808188 B1 | 3/2008 |

(Continued)

OTHER PUBLICATIONS

International Search Report dated Sep. 16, 2014 in PCT KR/2014/004052 filed May 7, 2014 (with English translation).

(Continued)

*Primary Examiner* — Hassan A Phillips
*Assistant Examiner* — Gautam Sharma
(74) *Attorney, Agent, or Firm* — Oblon, McClelland, Maier & Neustadt, L.L.P.

(57) ABSTRACT

A wireless device and method for managing a multicast group within a wireless network are disclosed. The wireless device is included in a first multicast group in which data is directly sent between member devices or data is sent using hopping between the member devices. The wireless device includes a reception unit, a determination unit, and a transmission unit. The reception unit receives a join request for joining a second multicast group from a joining device that attempts to join the second multicast group. The determination unit extracts information about the second multicast (Continued)

group from the join request, and determines whether the second multicast group is identical with the first multicast group based on the information about the second multicast group. The transmission unit forwards the join request to another device or sends a response to the join request to the joining device based on a result of the determination.

10 Claims, 14 Drawing Sheets

(56) References Cited

FOREIGN PATENT DOCUMENTS

| | | |
|---|---|---|
| KR | 10-1109658 B1 | 1/2012 |
| WO | WO 2012-167432 | 12/2012 |

OTHER PUBLICATIONS

Technical Proposal for IEEE 802.15.8 Working Group for Wireless Personal Area Networks (WPANs), Jeongseok Yu et al., Chung-Ang University, May 2013.

Proposal of Multi-hop Multicast/Unicast/Peer Discovery Protocols and Security Mechanism for IEEE 802.15.8, Jeongseok Yu et al., Chung-Ang University, May 2013.

* cited by examiner

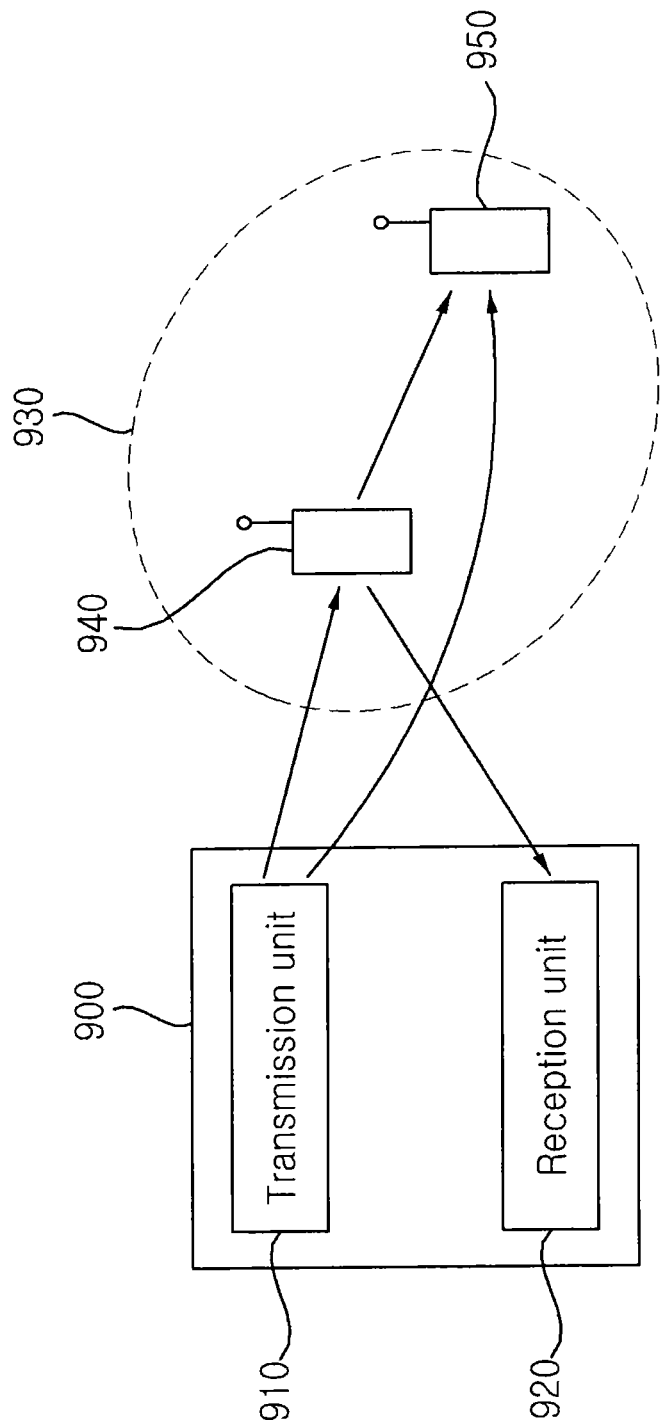

DEVICE AND METHOD FOR MANAGING MULTICAST GROUP IN WIRELESS NETWORK

CROSS-REFERENCE TO RELATED APPLICATION

The present application is a continuation application of International Application No. PCT/KR2014/04052, filed May 7, 2014, which is based upon and claims priority to Korean Patent Application No. 10-2013-0062149, filed May 30, 2013, Korean Patent Application No. 10-2013-0062152, filed May 30, 2013, and to Korean Patent Application No. 10-2014-0054453, filed May 7, 2014. The contents of these applications are incorporated herein by reference in their entirety.

TECHNICAL FIELD

The following embodiments relate to a device and method for managing a multicast group within a wireless network and, more particularly, to a technology that manages a multicast group when wireless devices included within a wireless network join and withdraw from the multicast group and restores a damaged multicast group.

BACKGROUND ART

A cellular mobile communication technology is a technology that provides communication services to wireless devices using an infrastructure, such as a base station. However, since wireless devices become aware of each other and directly send data to each other, a demand for a technology using communication services without requiring an infrastructure, such as a base station, surpasses a demand for a cellular mobile communication technology. In the case of communication services without using an infrastructure, each wireless device may send data to another wireless device via other wireless devices.

Although such a technology is employed, there is a need for a multicast service in which wireless devices having common interest are grouped into a multicast group and data is sent to the wireless devices included in the multicast group.

In the case of communication services using an infrastructure, such as cellular mobile communication, multicast data is sent directly from an infrastructure, such as a base station, to a wireless device, and the management of a multicast group is relatively simple.

However, in the case of communication services without using an infrastructure, multicast data is sent via a plurality of wireless devices. Therefore, there is a difficulty in the management of a multicast group because the multicast group is not maintained even when any one wireless device withdraws from the multicast group.

SUMMARY OF THE DISCLOSURE

An object of the following embodiments is to manage a multicast group within a wireless network.

An object of the following embodiments is to restore a damaged multicast group in a wireless network.

In accordance with an aspect of the present invention, there is provided with a wireless device included in a first multicast group in which data is directly sent between member devices or data is sent using hopping between the member devices, the wireless device including: a reception unit configured to receive a join request for joining a second multicast group from a joining device that attempts to join the second multicast group; a determination unit configured to extract information about the second multicast group from the join request, and to determine whether the second multicast group is identical with the first multicast group based on the information about the second multicast group; and a transmission unit configured to forward the join request to another device or send a response to the join request to the joining device based on a result of the determination.

The determination unit may be further configured to determine a number of hops from the joining device to the wireless device; and the transmission unit may be further configured to discard the join request if the determined number of hops is larger than a predetermined number.

The transmission unit may be further configured to send the response to the join request to the joining device if the second multicast group is identical with the first multicast group.

The transmission unit may be further configured to send a redundant transmission prevention message to a second member device included in the second multicast group; and the redundant transmission prevention message may be used to prevent the second member device from sending a response to the join request to the joining device even if the join request has been sent to the second member device.

In accordance with another aspect of the present invention, there is provided with a joining device attempting to join a first multicast group in which data is directly sent between member devices or data is sent using hopping between the member devices, the joining device including: a transmission unit configured to send a join request for joining the first multicast group to a member device included in a second multicast group; and a reception unit configured to receive a response to the join request from the member device if the first multicast group is identical with the second multicast group; wherein whether the first multicast group is identical with the second multicast group is determined by comparing information about the first multicast group, extracted from the join request, with information about the second multicast group; and wherein the join request is sent to another device if the first multicast group is not identical with the second multicast group.

The join request may be discarded if the number of hops from the joining device to the member device is larger than a predetermined number.

A redundant transmission prevention message may be sent from the member device to another member device included in the second multicast group if the first multicast group is identical with the second multicast group; and the redundant transmission prevention message may be used to prevent the another member device from sending a response to the join request to the joining device even if the join request has been sent to the another member device.

In accordance with still another aspect of the present invention, there is provided with a member device included in a multicast group, the member device including: a determination unit configured to determine that the multicast group has been damaged if information about the multicast group has not been received from a withdrawing device included in the multicast group for a specific time; a transmission unit configured to send restoration information about the multicast group to a second member device included in the multicast group based on a result of the determination; and a reception unit configured to receive a response to the restoration information from the second member device, and to restore the multicast group using the response.

The information about the multicast group may be included and received in a multicast group notification frame (MGNF).

The reception unit may be further configured to receive the information about the multicast group from the second member device included in the multicast group; and the determination unit is further configured to estimate a damaged location based on the information about the multicast group received from the second member device and the withdrawing device, and to set a timer based on a result of the estimation.

The transmission unit may send the restoration information about the multicast group when the set timer expires.

The timer may be set to a value proportional to a distance between the damaged location and the member device or a number of hops between the damaged location and the member device.

The restoration information about the multicast group may be included and sent in an advertisement command frame (ACF).

The advertisement command frame may be sent only up to a wireless device spaced apart from the member device by a predetermined number of hops.

BRIEF DESCRIPTION OF THE DRAWINGS

The above and other objects, features and advantages of the present invention will be more clearly understood from the following detailed description taken in conjunction with the accompanying drawings, in which:

FIG. 9 is a block diagram illustrating the configuration of a joining device that attempts to join a multicast group;

DETAILED DESCRIPTION OF THE DISCLOSURE

Hereinafter, embodiments of the present invention are described with reference to the accompanying drawings.

Figure 1:
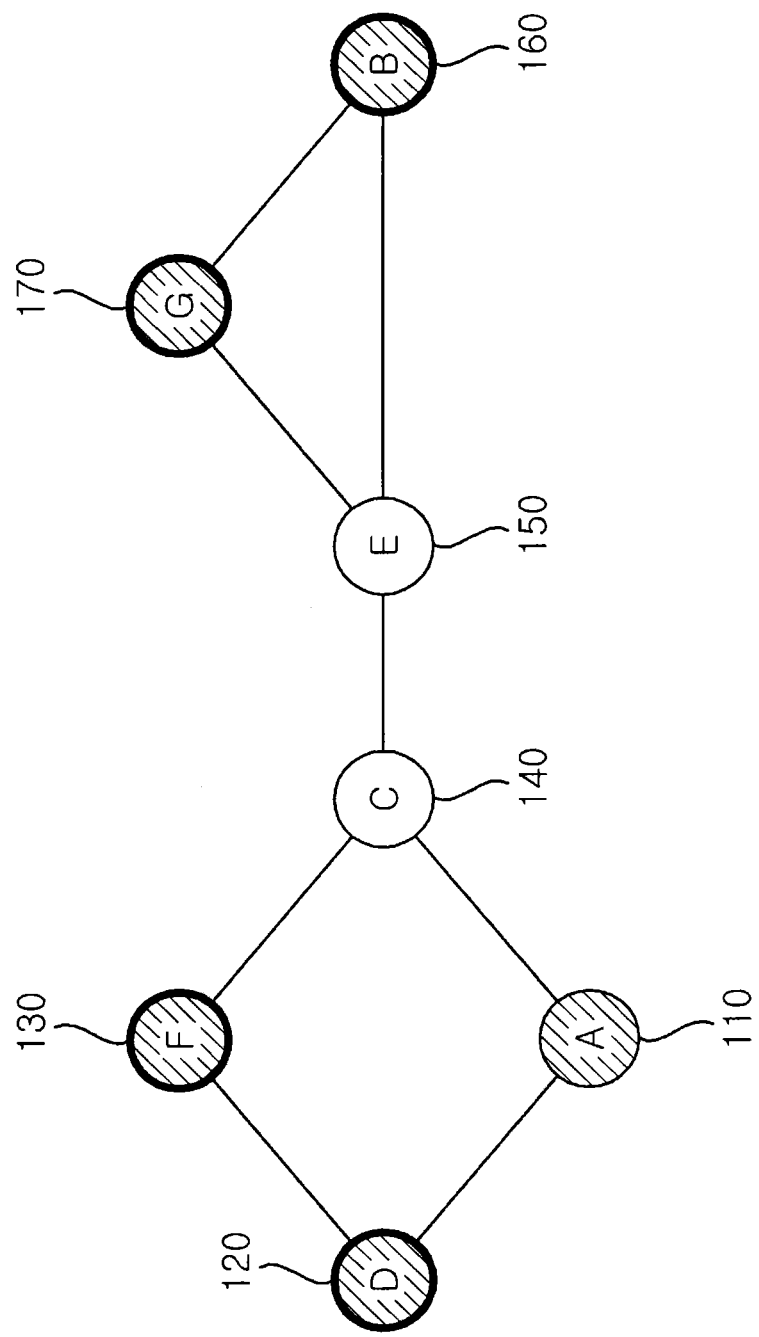
FIGS. 1 to 7 are diagrams illustrating embodiments in which multicast groups are managed within a wireless network.

FIG. 1 is a diagram illustrating a wireless network in which wireless devices are included.

A plurality of wireless devices 110, 120, 130, 140, 150, 160 and 170 forms a wireless network. Each of the wireless devices 110, 120, 130, 140, 150, 160 and 170 may send data to only adjacent wireless devices. In this case, the adjacent wireless devices (e.g., the wireless device A 110 and the wireless device D 120) are referred to as devices that are spaced apart from each other by a 1-hop distance. Furthermore, the distance between the wireless device A 110 and the wireless device D 120 may be considered to be a 1-hop.

Accordingly, each of the wireless devices 110, 120, 130, 140, 150, 160 and 170 illustrated in FIG. 1 can directly send data to another wireless device spaced apart by the 1-hop distance, but cannot directly send data to another wireless device spaced apart by a 2- or more-hop distance.

In order to send data to another wireless device spaced apart by a 2- or more-hop distance, each wireless device needs to pass through one or more wireless devices. For example, in order for the wireless device A 110 to send data to the wireless device B 160, the wireless device A 110 sends data to the wireless device C 140. The wireless device C 140 forwards the data to the wireless device E 150, and the wireless device E 150 forwards the forwarded data to the wireless device B 160 again.

The wireless devices illustrated in FIG. 1 may form a multicast group. The multicast group is a group including various wireless devices. A specific wireless device included in the multicast group may multicast data to other wireless devices included in the multicast group.

Figure 2:
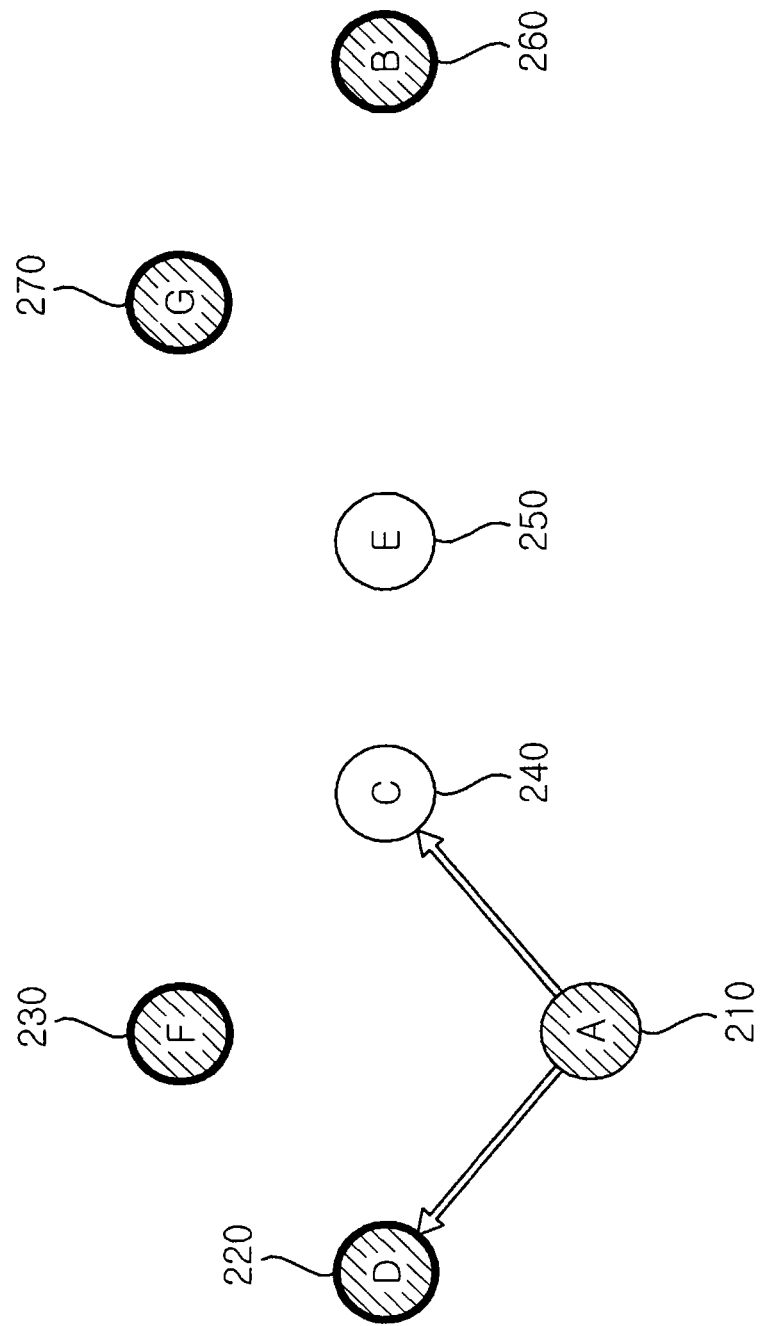

FIG. 2 is a diagram illustrating an embodiment of a case where a new wireless device joins a multicast group.

In FIG. 2, a wireless device D 220, a wireless device F 230, a wireless device G 270, and a wireless device B 260 are wireless devices included in a multicast group. A wireless device A 210 is a wireless device that attempts to join the multicast group. The wireless device C 240 and the wireless device E 250 are wireless devices that are not included in the multicast group.

In FIG. 2, in order to join the multicast group, the wireless device A 210 may send an advertisement command frame (ACF) to the wireless device D 220 and the wireless device C 240 that are spaced apart by a 1-hop distance.

The advertisement command frame is control information that is sent from a wireless device to wireless devices, included in a multicast group, in order to join the multicast group. In accordance with an aspect of the present invention, the advertisement command frame may include information about a wireless device that desires to join a multicast group. Furthermore, the advertisement command frame may be set such that it is sent from a wireless device, desiring to join a multicast group, to only wireless devices spaced apart by a K-hop distance. In this case, if a multicast group is not present within the K-hop distance, the wireless device is unable to join the multicast group.

Figure 3:
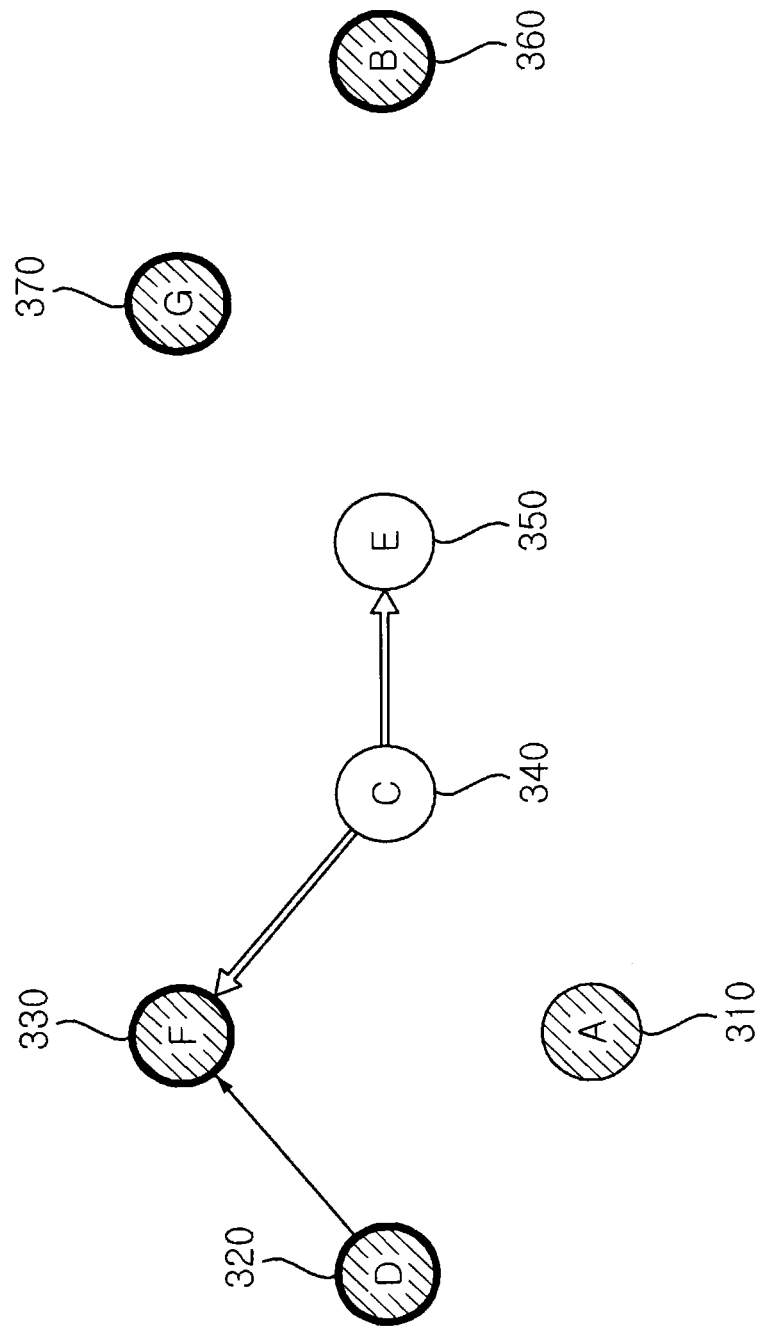

FIG. 3 is a diagram illustrating an embodiment of a case where a new wireless device joins a multicast group.

Referring to FIG. 3, a wireless device D 320 and a wireless device C 340 have received an advertisement command frame from a wireless device A 310.

The wireless device C 340 stores the received advertisement command frame. Furthermore, the wireless device C 340 stores information about a wireless device that has sent the advertisement command frame to the wireless device C 340, and information about the first wireless device that has sent the advertisement command frame. In FIG. 3, the wireless device that has sent the advertisement command frame to the wireless device C 340 and the first wireless device that has sent the advertisement command frame correspond to the wireless device A 310.

In FIG. 3, the wireless device C 340 is a wireless device that is not included in a multicast group. In this case, the wireless device C 340 sends the advertisement command frame to another wireless device F 330 and another wireless device E 350 that are spaced apart by a 1-hop distance.

The wireless device D 320 stores the received advertisement command frame. Furthermore, the wireless device D 320 stores information about a wireless device that has sent the advertisement command frame to the wireless device D 320, and information about the first wireless device that has sent the advertisement command frame. In FIG. 3, the wireless device that has sent the advertisement command frame to the wireless device D 320 and the first wireless device that has sent the advertisement command frame correspond to the wireless device A 310.

The wireless device D 320 is a wireless device that is included in the multicast group. In this case, the wireless device D 320 may send an advertisement reply command frame (ARCF) to the wireless device A 310 in response to the advertisement command frame from the wireless device A 310. In this case, the advertisement reply command frame is control information including information using which the wireless device A 310 joins the multicast group.

In accordance with the topology illustrated in FIG. 3, not only the wireless device D 320 but also a wireless device F 330 included in the multicast group may receive the advertisement command frame and send an advertisement reply command frame in response thereto. In this case, an unnecessary advertisement reply command frame may be additionally sent to the wireless device A 310.

In accordance with an aspect of the present invention, the wireless device D 320 may send a multicast group notification frame (MGNF) that prevents the sending of an unnecessary advertisement reply command frame to another wireless device F 330 that is included in the multicast group. The wireless device F 330 that has received the multicast group notification frame that prevents the sending of an unnecessary advertisement reply command frame may not send an advertisement reply command frame even if it has received the advertisement command frame from the wireless device C 340.

Figure 4:
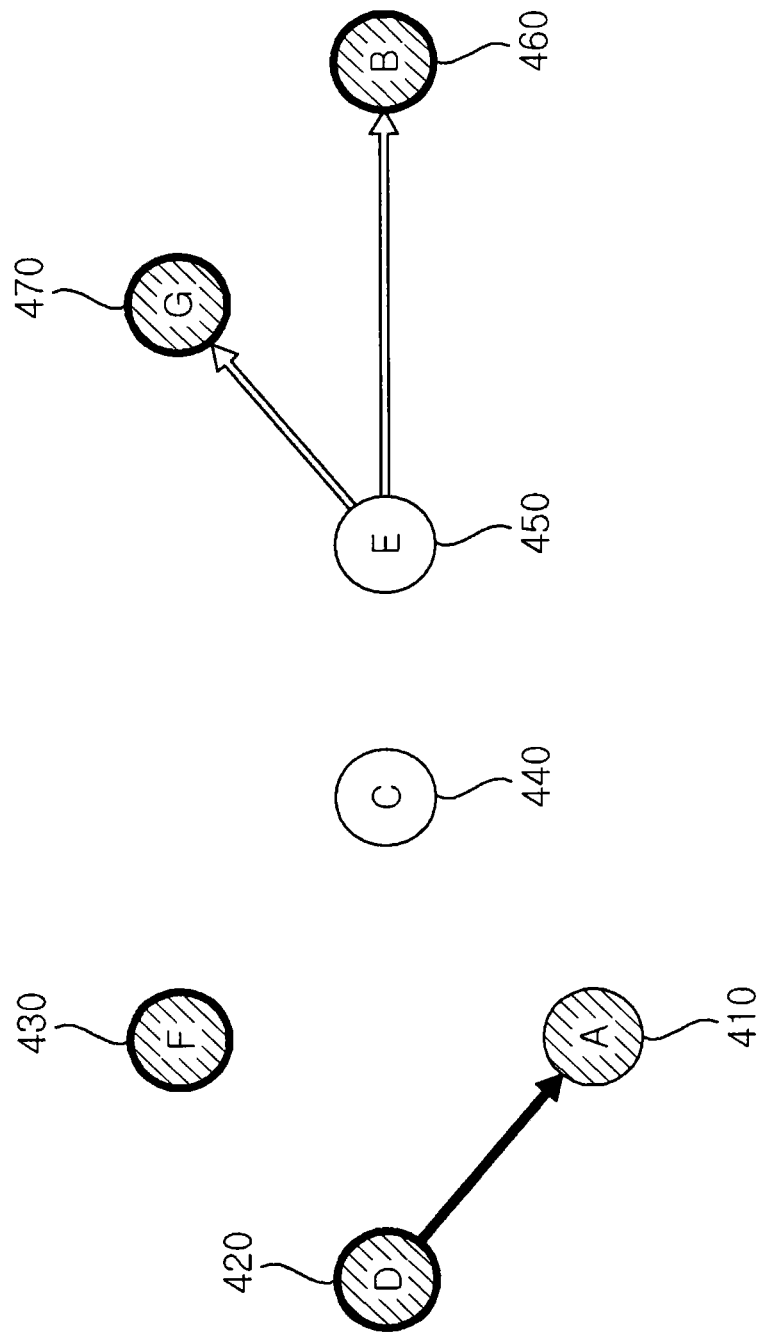

FIG. 4 is a diagram illustrating an embodiment of a case where a new wireless device joins a multicast group.

Referring to FIG. 4, a wireless device D 420 has received an advertisement command frame from a wireless device A 410. Furthermore, a wireless device F 430 has received a multicast group notification frame that prevents the sending of an unnecessary advertisement reply command frame from the wireless device D 420. A wireless device E 450 has received the advertisement command frame from a wireless device C 440.

The wireless device D 420 may send an advertisement reply command frame to the wireless device A 410.

The wireless device F 430 may not send an advertisement reply command frame in response to the multicast group notification frame received from the wireless device D 420.

The wireless device E 450 may send the advertisement command frame to a wireless device G 470 and a wireless device B 460.

Figure 5:
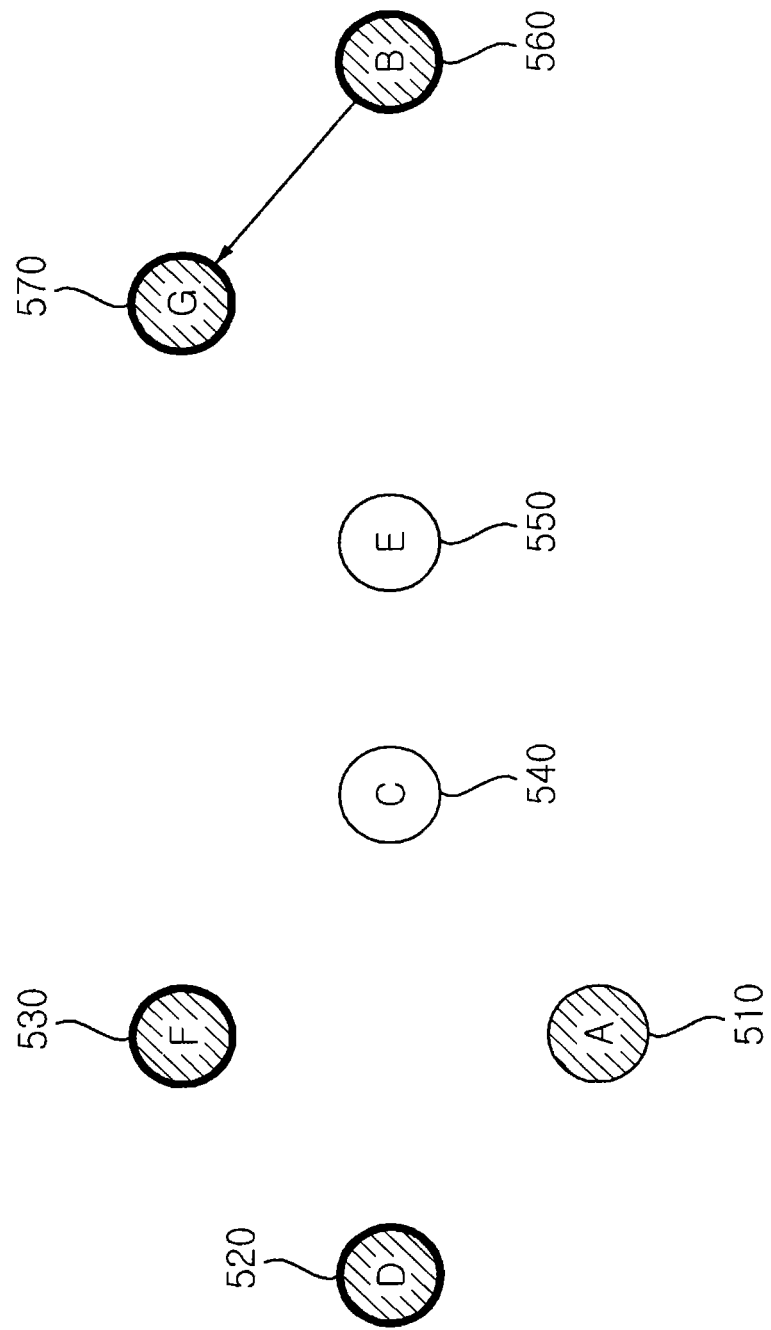

FIG. 5 is a diagram illustrating an embodiment of a case where a new wireless device joins a multicast group.

Referring to FIG. 5, a wireless device A 510 has received an advertisement reply command frame from a wireless device D 520. Furthermore, a wireless device G 570 and a wireless device B 560 have received an advertisement command frame from a wireless device E 550.

In accordance with an aspect of the present invention, the wireless device B 560 that has received the advertisement command frame may send a multicast group notification frame, preventing the sending of an unnecessary advertisement reply command frame, to another wireless device G 570 that is included in a multicast group.

Figure 6:
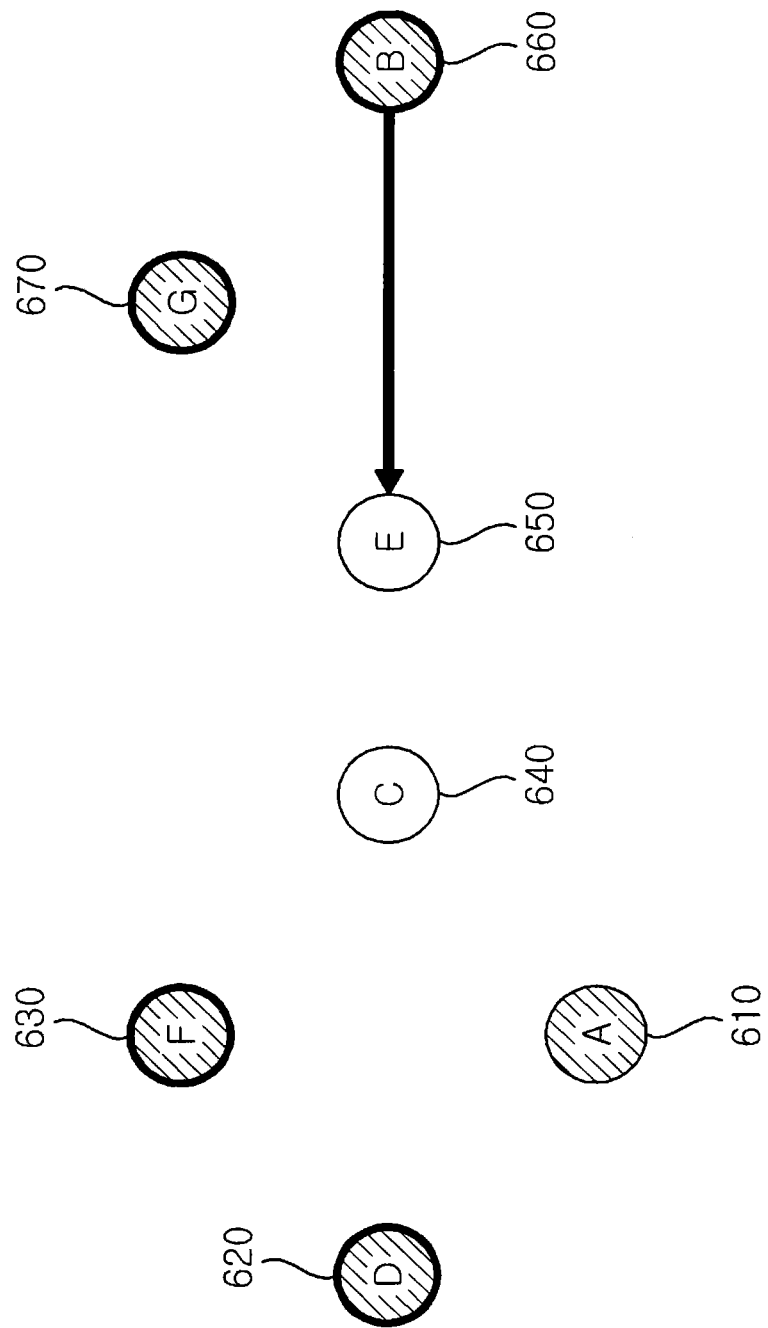

FIG. 6 is a diagram illustrating an embodiment of a case where a new wireless device joins a multicast group.

Referring to FIG. 6, a wireless device G 670 has received a multicast group notification frame, preventing the sending of an unnecessary advertisement reply command frame, from a wireless device B 660.

The wireless device G 670 may not send an advertisement reply command frame in response to the multicast group notification frame. In contrast, the wireless device B 660 may send an advertisement reply command message in response to an advertisement command message. The wireless device B 660 may send an advertisement reply command message to the wireless device E 650 that has received the advertisement command message.

Figure 7:
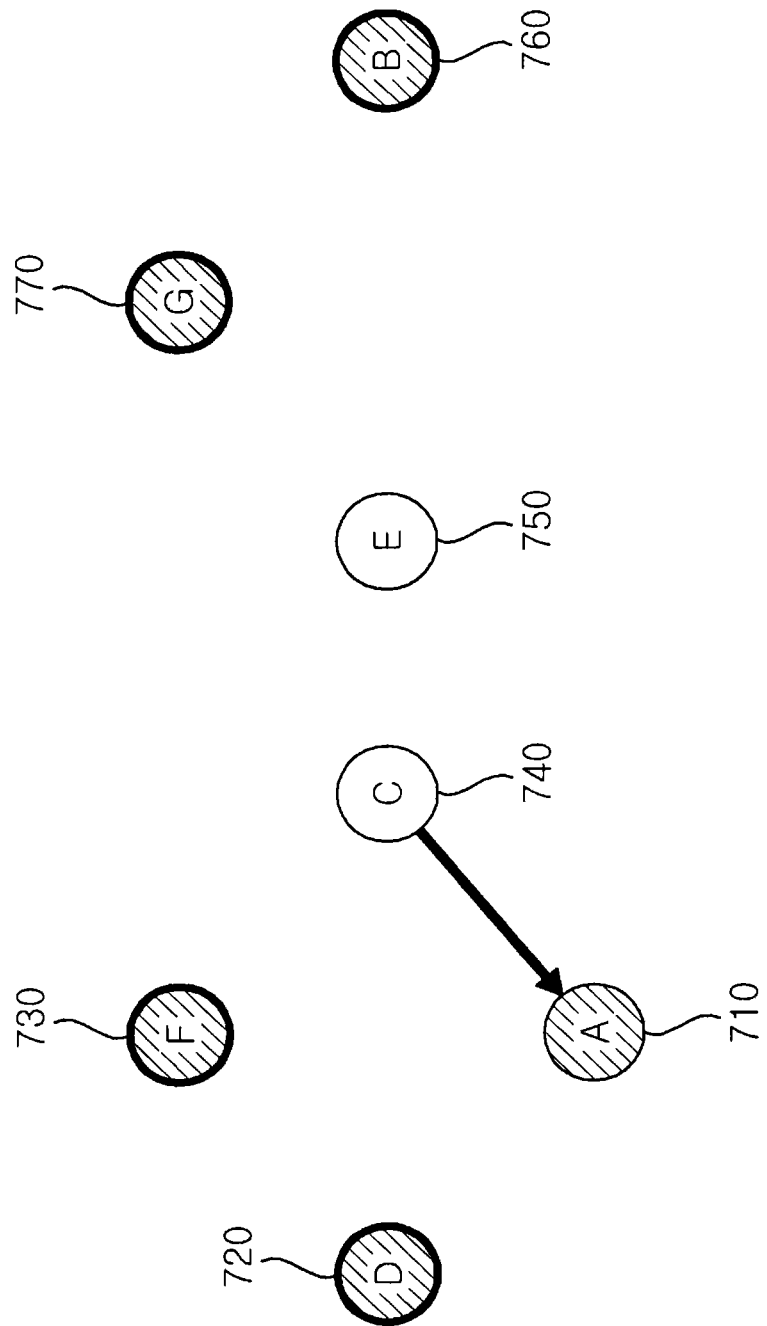

FIG. 7 is a diagram illustrating an embodiment of a case where a new wireless device joins a multicast group.

Referring to FIG. 7, a wireless device E 750 has received an advertisement reply command message from a wireless device B 760.

The wireless device E 750 determines an advertisement command message to which the received advertisement reply command message corresponds. If it is determined that the received advertisement reply command message corresponds to an advertisement command message received from the wireless device C 740, the wireless device E 750 forwards the received advertisement reply command message to the wireless device C 740.

The wireless device C 740 forwards the received advertisement reply command message to a wireless device A 710 in a similar manner.

In accordance with the embodiment illustrated in FIGS. 2 to 7, the wireless device A that attempts to join a multicasting group may easily discover a surrounding multicasting group. Although a multicasting group is not away from the wireless device A by a 1-hop distance, but is spaced apart from the wireless device A by a 2- or more-hop distance, the wireless device A may discover the multicasting group using other wireless devices C and E that are not included in the multicasting group.

Accordingly, the wireless device A that attempts to join the multicasting group may join the multicasting group easily and simply.

Figure 8:
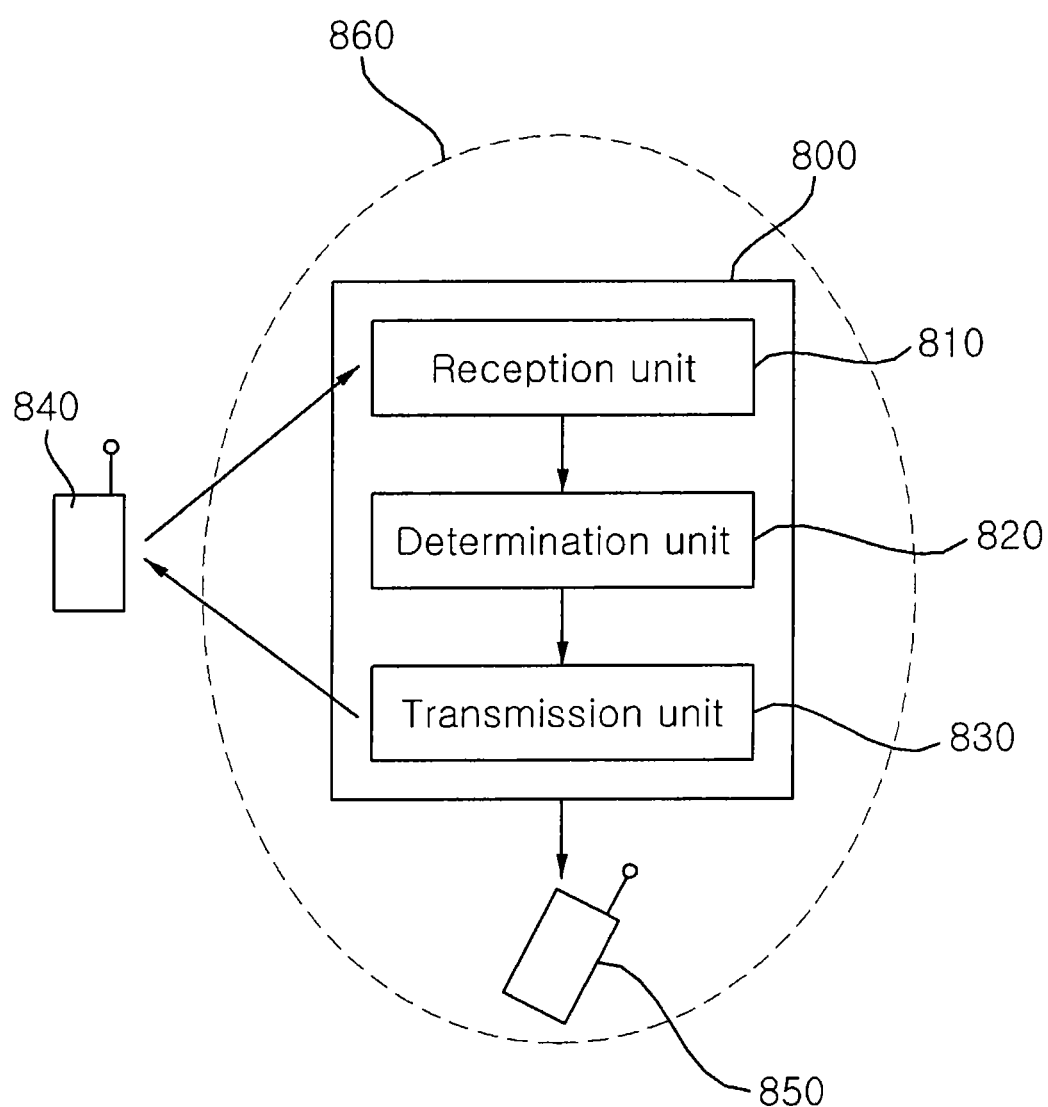
FIG. 8 is a block diagram illustrating the configuration of a member device that is included in a multicast group.

FIG. 8 is a block diagram illustrating the configuration of a member device that is included in a multicast group.

The member device 800 according to an exemplary embodiment includes a reception unit 810, a determination unit 820, and a transmission unit 830.

The member device 800 is a wireless device that forms a multicast group 860 along with another member device 850. A joining device 840 is a wireless device that attempts to join the multicast group 860.

The reception unit 810 receives a join request from the joining device 840 that attempts to join the multicast group 860. In accordance with an aspect of the present invention, the join request may be included in an advertisement command frame (ACF) and sent. The join request may include at least one of information about the joining device 840, information about a service that the joining device 840 desires to use, and information about a multicast group that the joining device 840 attempts to join.

The determination unit 820 extracts information about a multicast group, which the joining device 840 attempts to join, from the join request. Furthermore, the determination unit 820 may determine whether the multicast group that the joining device 840 attempts to join is the same as the multicast group 860 in which the member device 800 is included. Alternatively, the determination unit 820 may determine whether the multicast group 860 in which the member device 800 is included is a multicast group capable of providing a service required by the joining device 840.

The transmission unit 830 may forward the join request to another device or send a response to the join request to the joining device 840 based on the result of the determination of the determination unit 820.

For example, if a multicast group that the joining device 840 attempts to join is the same as the multicast group 860 in which the member device 800 is included or if the multicast group 860 in which the member device 800 is included is a multicast group capable of providing a service required by the joining device 840, the transmission unit 830 may send a response to the join request to the joining device 840 so that the joining device 840 can join the multicast group 860.

Alternatively, if a multicast group that the joining device 840 attempts to join is not the same as the multicast group 860 in which the member device 800 is included or if the multicast group 860 in which the member device 800 is included is unable to provide a service required by the joining device 840, the transmission unit 830 may forward the join request to another wireless device (not illustrated). In this case, another wireless device to which the join request has been forwarded by the transmission unit 830 may be a wireless device that is not included in the multicast group 860.

In accordance with an aspect of the present invention, the join request may be set such that it is sent from the joining device 840 only up to a wireless device spaced apart by a K-hop distance. In this case, the determination unit 820 may determine the number of hops from the joining device to the member device 800. If the number of hops from the joining device 840 to the member device 800 is only within the K-hop, the transmission unit 830 may respond to the join request or may forward the join request to another wireless device.

If the number of hops from the joining device 840 to the member device 800 is larger than "K," the transmission unit 830 may discard the join request received from the joining device 840 and may not respond to the join request.

In accordance with an aspect of the present invention, the join request may include information about the number of hops from the joining device 840. The determination unit 820 may determine the number of hops from the joining device 840 to the member device 800 using information about the number of hops that is included in the join request.

In accordance with an aspect of the present invention, the join request sent by the joining device 840 may be sent to the plurality of member devices 800 and 850 that are included in the multicast group 860. In this case, if each of the member devices 800, 850 responds to the join request, radio resources or power is inefficiently wasted.

In order to prevent such a problem, if the member device 800 receives the join request, the transmission unit 830 may send a redundant transmission prevention message to another member device 850 that is included in the multicast group 860. The redundant transmission prevention message may include information about the joining device 840.

In the case where another member device 850 receives the redundant transmission prevention message, although the join request has been sent to another member device 850, another member device 850 does not send a response to the join request to the joining device 840. Accordingly, a response to the join request is not redundantly sent.

FIG. 9 is a block diagram illustrating the configuration of a joining device that attempts to join a multicast group.

The joining device 900 according to an exemplary embodiment includes a transmission unit 910 and a reception unit 920.

The joining device 900 may join a multicast group in order to use a variety of types of communication services, such as voice transmission and data transmission.

The transmission unit 910 may send a join request in order to join a multicast group. In accordance with an aspect of the present invention, the join request may be included and sent in an advertisement command frame (ACF). The join request may include information about the joining device 900, information about a service that the joining device 900 desires to use, and information about a multicast group that the joining device 900 attempts to join.

If the multicast group that the joining device 900 attempts to join is the same as a multicast group 930 including member devices 940 and 950, the reception unit 920 may receive a response to the join request from the member devices 940 and 950. Alternatively, if the multicast group 930 is able to provide the services that the joining device 900 desires to use, the reception unit 920 may receive a response to the join request from the member devices 940 and 950.

If the multicast group that the joining device 900 attempts to join is not the same as the multicast group including the member devices 940 and 950 or if the multicast group 930 is unable to provide the services that the joining device 900 desires to use, the join request sent by the transmission unit 910 may be forwarded to another wireless device.

In accordance with an aspect of the present invention, the join request may be set such that it is sent from the joining device 900 only up to a wireless device spaced apart by a K-hop distance. In this case, the member devices 940 and 950 may determine the number of hops from the joining device 900 to the member devices 940 and 950. If the number of hops from the joining device 900 to the member devices 940 and 950 is within "K," the member devices 940 and 950 may respond to the join request or may forward the join request to another wireless device.

If the number of hops from the joining device 900 to the member devices 940 and 950 is larger than "K," the member devices 940 and 950 may discard the join request received from the joining device 900 and may not respond to the join request. In this case, the joining device 900 is unable to join the multicast group 930.

In accordance with an aspect of the present invention, the join request sent by the transmission unit 910 may be sent to the plurality of member devices 940 and 950 that are included in the multicast group 930. In this case, the member device 940 that has first received the join request may send a redundant transmission prevention message to another member device 950 included in the multicast group 930.

When receiving the redundant transmission prevention message, another member device 950 does not send a response to the join request to the joining device 900 even if it receives the join request. Accordingly, a response to the join request is not redundantly sent.

Figure 10A:
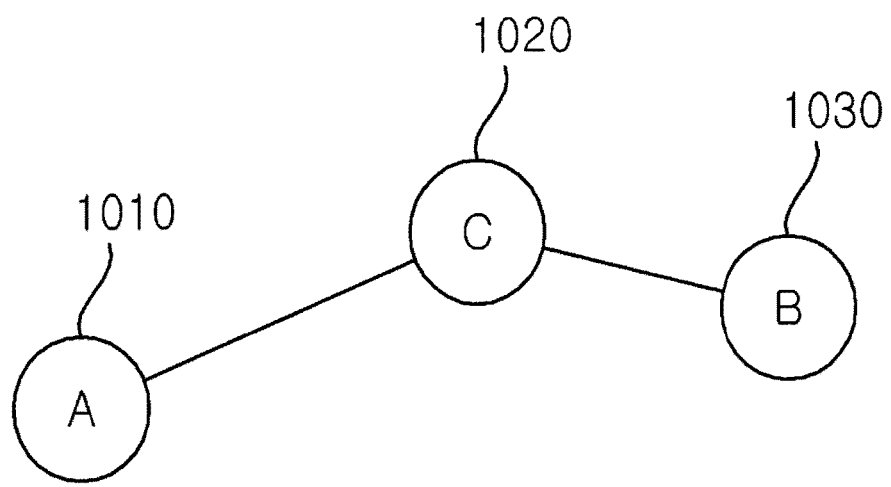
FIGS. 10A and 10B are diagrams illustrating a change in a multicast group according to an exemplary embodiment.
Figure 10B:
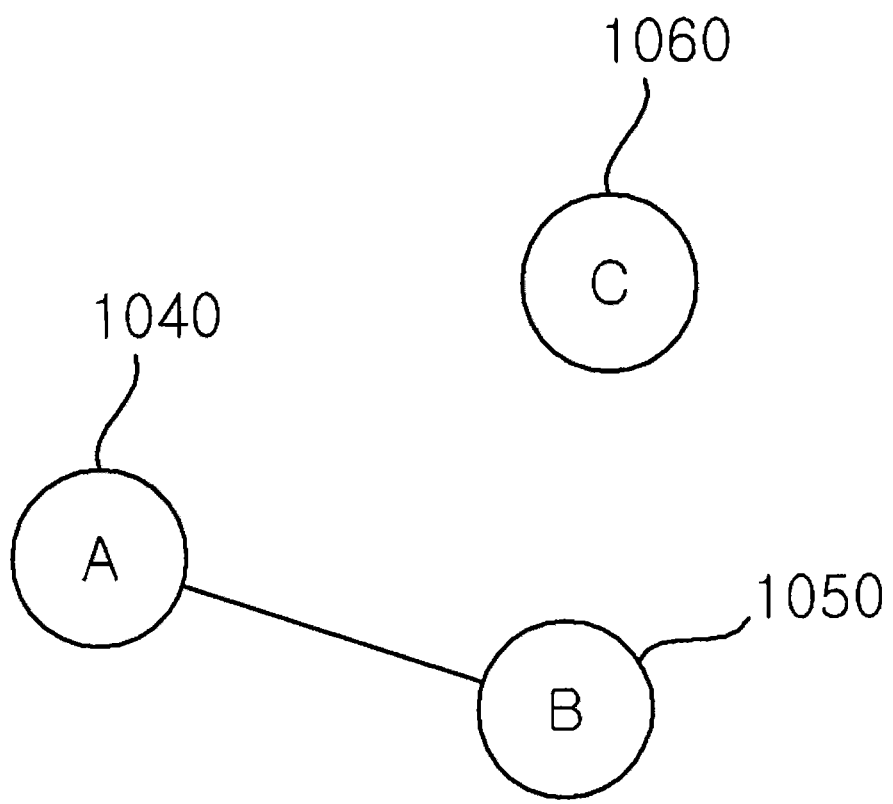

FIGS. 10A and 10B are diagrams illustrating a change in a multicast group according to exemplary embodiments.

FIG. 10A illustrates the state before a wireless device B 1030 moves.

A wireless network illustrated in FIG. 10A includes three wireless devices A 1010, B 1030 and C 1020. The wireless devices A 1010, B 1030 and C 1020 may send data to only adjacent wireless devices. In this case, adjacent wireless devices (e.g., the wireless devices A 1010 and C 1020) are referred to as devices that are spaced apart from each other by a 1-hop distance. Furthermore, the distance between the wireless device A 1010 and the wireless device C 1020 may be considered to be a 1-hop. Accordingly, the wireless devices A 1010, B 1030 and C 1020 can directly send data to another wireless device spaced apart by the 1-hop distance, and cannot directly send data to another wireless device spaced apart by a 2- or more-hop distance. In FIG. 10A, the wireless devices A 1010 and B 1030 are spaced apart by the 2-hop distance. Accordingly, the wireless device A 1010 cannot directly send data to the wireless device B 1030. The wireless device A 1010 may send data to the wireless device B 1030 in such a manner that the wireless device A 1010 sends the data to the wireless device C 1020 and the wireless device C 1020 forwards the data to the wireless device B 1030 again.

In accordance with an aspect of the present invention, the wireless devices A 1010 and B 1030 may be included in a multicast group, and the wireless device C 1020 may not be included in the multicast group. In this case, the wireless device C 1020 that is not included in the multicast group needs to include a routing table for multicasting between the wireless device A 1010 and the wireless device B 1030 that are included in the multicast group.

FIG. 10B is a diagram after a wireless device B 1050 has moved. The wireless device B 1050 moves, and is spaced apart from a wireless device A 1040 by a 1-hop distance. Accordingly, the wireless devices A 1040 and B 1050 included in the multicasting group can directly send data to each other. A wireless device C 1060 does not need to maintain a routing table for the wireless devices A 1040 and B 1050.

FIGS. 10A and 10B illustrate an embodiment in which the wireless devices C 1020 and C 1060 do not need to maintain a routing table even if the wireless devices B 1030 and B 1050 move. However, in accordance with another embodiment, the wireless devices B 1030 and B 1050 may move in the state in which they have been spaced apart by a 1-hop distance from the wireless devices A 1010 and A 1040, and may be then spaced apart by a 2-hop distance. In this case, the wireless devices C 1020 and C 1060 may generate a routing table, and may forward data between the wireless devices A 1010 and A 1040 and the wireless devices B 1030 and B 1050.

If the wireless devices C 1020 and C 1060 do not forward the data, the multicasting group including the wireless devices A 1010 and A 1040, and the wireless devices B 1030 and B 1050 are no longer maintained.

In accordance with yet another embodiment, the wireless device C 1020 that forwards data between the wireless device A 1010 and the wireless device B 1030 may move to another location. In this case, since data is unable to be directly sent between the wireless device A 1010 and the wireless device B 1030, the wireless device A 1010 and the wireless device B 1030 may discover another wireless device capable of forwarding data or release the multicasting group.

As described in FIGS. 10A and 10B, if a wireless device that is not included in a multicasting group has moved in addition to a wireless device included in the multicasting group, the multicasting group needs to be restored by correcting information about the multicasting group.

Figure 11:
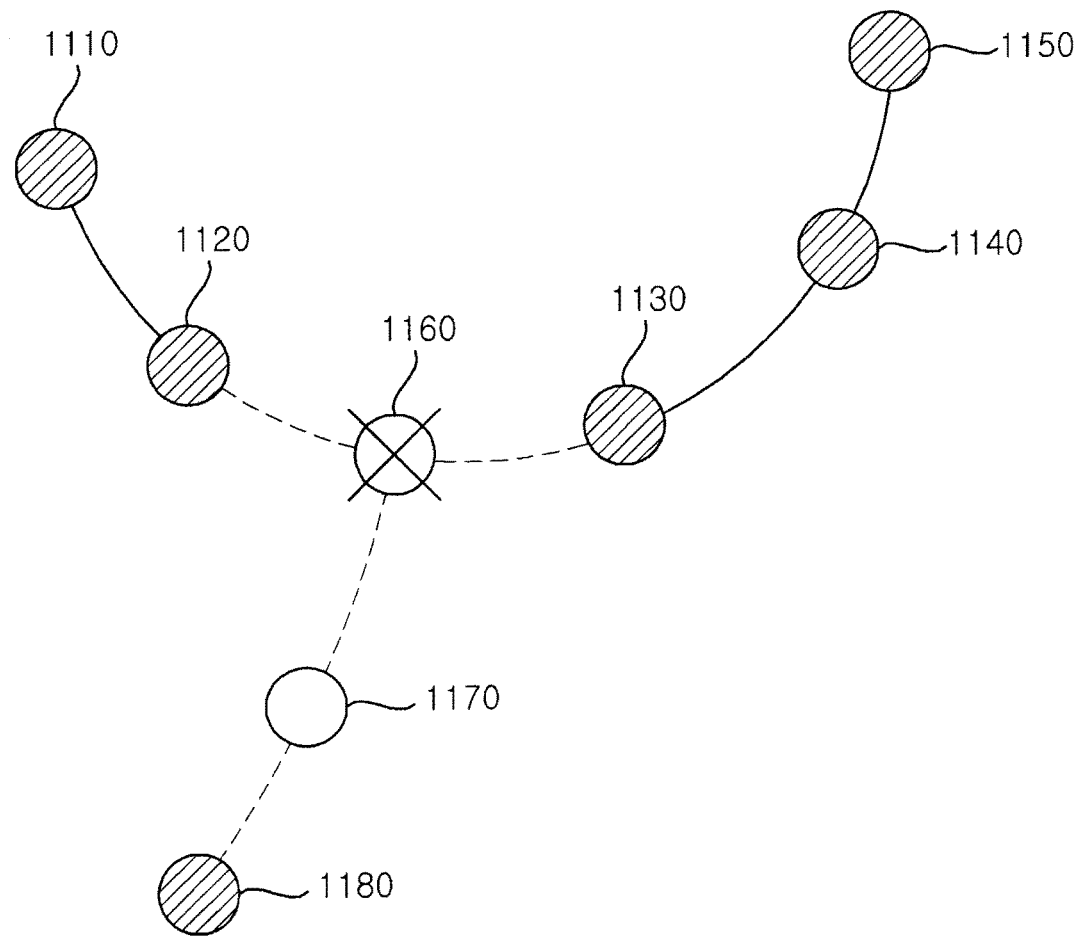
FIG. 11 is a diagram illustrating an embodiment in which a multicast group is restored when a forwarding device withdraws.

FIG. 11 is a diagram illustrating an embodiment in which a multicast group is restored when a forwarding device withdraws.

In FIG. 11, wireless devices 1110, 1120, 1130, 1140, 1150 and 1180 are wireless devices included in a multicasting group, and wireless devices 1160 and 1170 are wireless devices that are not included in the multicasting group.

The wireless devices 1120 and 1130 included in the multicasting group send data via the wireless device 1160 that is not included in the multicasting group.

In accordance with an aspect of the present invention, the wireless devices 1110, 1120, 1130, 1140, 1150 and 1180 included in the multicasting group may manage the multicasting group using a multicast group notification frame (MGNF). For example, the wireless devices 1110, 1120, 1130, 1140, 1150 and 1180 included in the multicasting group may periodically or non-periodically send the multicast group notification frame to other wireless devices included in the multicasting group. Each of the wireless devices 1110, 1120, 1130, 1140, 1150 and 1180 may receive the multicast group notification frame from other wireless devices and determine that the multicasting group is maintained.

In accordance with an aspect of the present invention, the multicast group notification frame may include information about a wireless device that has first sent the multicast group notification frame and a wireless device that has forwarded the multicast group notification frame. Accordingly, each of the wireless devices 1110, 1120, 1130, 1140, 1150 and 1180 may determine the topology of the multicast group using the multicast group notification frame.

In accordance with an aspect of the present invention, the wireless device 1160 not included in the multicasting group may stop the sending of data. For example, the wireless device 1160 may block power and terminate all the functions including communication, and may move to a completely different location.

In this case, the wireless devices 1110 and 1120 included in the multicasting group are unable to send data to other wireless devices 1130, 1140, 1150 and 1180 included in the multicasting group. The wireless devices 1110, 1120, 1130, 1140, 1150 and 1180 included in the multicasting group are unable to receive a multicast group notification frame. Accordingly, the wireless devices 1110, 1120, 1130, 1140, 1150 and 1180 included in the multicasting group may determine that the multicast group has been damaged.

In accordance with an aspect of the present invention, the wireless devices 1110, 1120, 1130, 1140, 1150 and 1180 included in the multicasting group may determine a wireless device that has withdrawn using topology information. For example, the wireless device 1120 is able to still receive a multicast group notification frame from the wireless device 1110, but is unable to receive a multicast group notification frame from the wireless device 1160. In this case, the wireless device 1120 may determine that it is closer to a location at which an accident has occurred than the wireless device 1110. The wireless device 1120 closer to the location at which the accident has occurred may attempt a local restoration operation for the multicast group.

In accordance with an aspect of the present invention, timers may be set for the wireless devices 1110, 1120, 1130, 1140, 1150 and 1180 included in the multicasting group depending on the distance from a location at which an accident has occurred. In accordance with an aspect of the present invention, a timer having a smaller value may be set for a wireless device closer to the location at which an accident has occurred.

Accordingly, the timer of the wireless device 1120 expires earlier than the timer of the wireless device 1110. The wireless device 1120 whose timer has expired attempts a local restoration operation. The wireless device 1130 may also attempt a local restoration operation.

The wireless device 1120 that attempts the local restoration operation may send an advertisement command frame (ACF). The advertisement command frame is control information including a service identifier that is common to the multicasting group. In accordance with an aspect of the present invention, the advertisement command frame may be set such that it is sent from the wireless device 1120 only up to a wireless device placed within a K-hop distance.

The wireless device 1110 may receive the advertisement command frame from the wireless device 1120. The wireless device 1110 compares the identifier of a service used by the wireless device 1110 with the identifier of a service included in the advertisement command frame. If the identifier of the service used by the wireless device 1110 is different from the identifier of the service included in the advertisement command frame, the service used by the wireless device 1110 is different from the serviced used by the multicasting group. Accordingly, the wireless device 1110 is unable to be included in the multicasting group. In this case, the wireless device 1110 may forward the advertisement command frame to another adjacent wireless device.

If the identifier of the service used by the wireless device 1110 is the same as the identifier of the service included in the advertisement command frame, the wireless device 1110 compares a timer set for the wireless device 1110 with a critical time. In accordance with an aspect of the present invention, the critical time may be included and sent in the advertisement command frame.

If the set timer has a value smaller than the critical time, the wireless device 1110 may send an advertisement reply command frame (ARCF) to the wireless device 1120. In this case, the advertisement reply command frame is control information including information using which the wireless device 1120 is able to generate a multicasting group.

The wireless device 1120 receives the advertisement reply command frame from the wireless device 1110, and may restore a multicasting group including the wireless device 1110 and the wireless device 1120.

Figure 12:
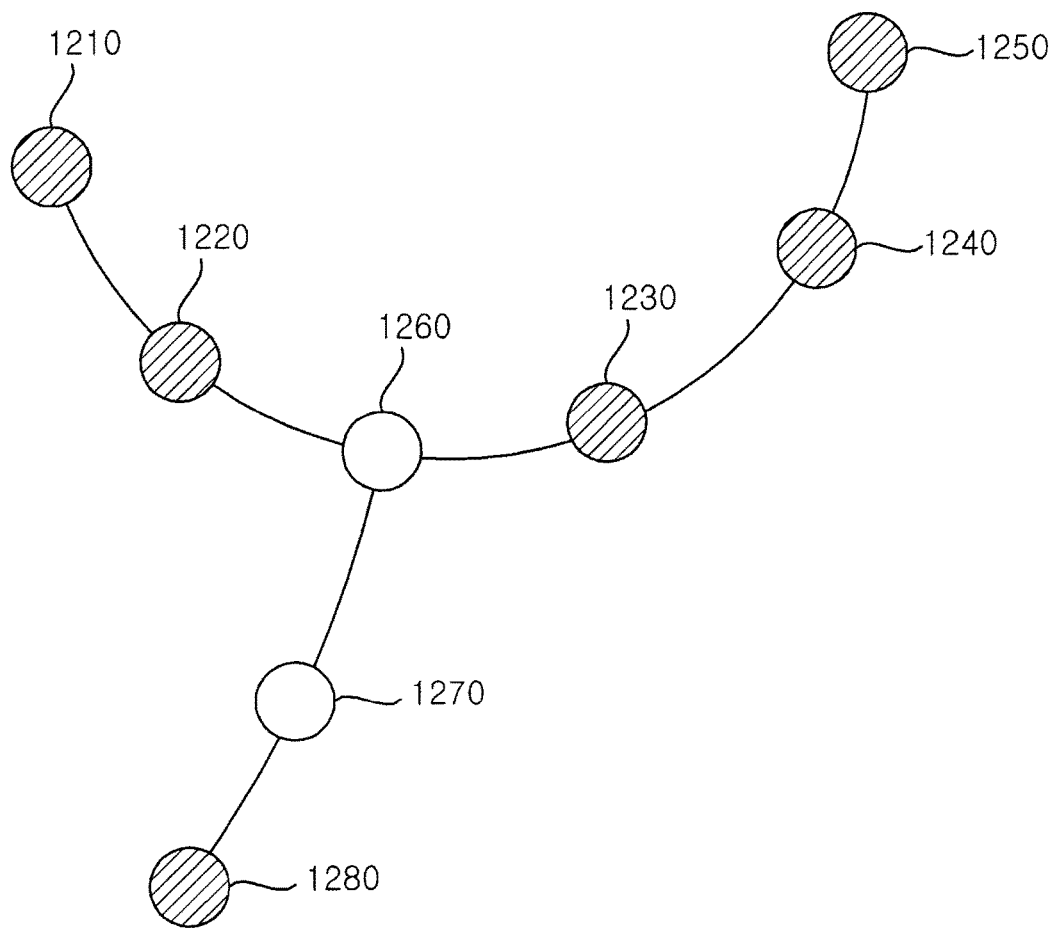
FIG. 12 is a diagram illustrating that a multicast group has been restored in accordance with an exemplary embodiment.

FIG. 12 is a diagram illustrating that a multicast group has been restored in accordance with an exemplary embodiment.

Referring to FIG. 12, a wireless device 1220 receives an advertisement reply command frame from the wireless device 1210, and may restore a multicasting group including the wireless device 1210 and the wireless device 1220.

In accordance with an aspect of the present invention, a wireless device 1260 that is not included in the multicasting group may be placed between the wireless device 1220 and a wireless device 1230. In this case, an advertisement command frame sent by the wireless device 1220 may be sent to the wireless device 1230 via the wireless device 1260.

The wireless device 1220 may receive an advertisement reply command frame from the wireless device 1230. In this case, the wireless device 1220 may generate a multicasting group including wireless devices 1240 and 1250 as well as the wireless device 1230.

In accordance with an aspect of the present invention, the wireless device 1230 may restore the multicasting group including the wireless devices 1230, 1240 and 1250. In this case, the service identifier of the multicasting group generated by the wireless device 1220 may be identical with the service identifier of the multicasting group generated by the wireless device 1230. The wireless device 1220 may merge the multicasting group generated by the wireless device 1220 and the multicasting group generated by the wireless device 1230.

Figure 13:
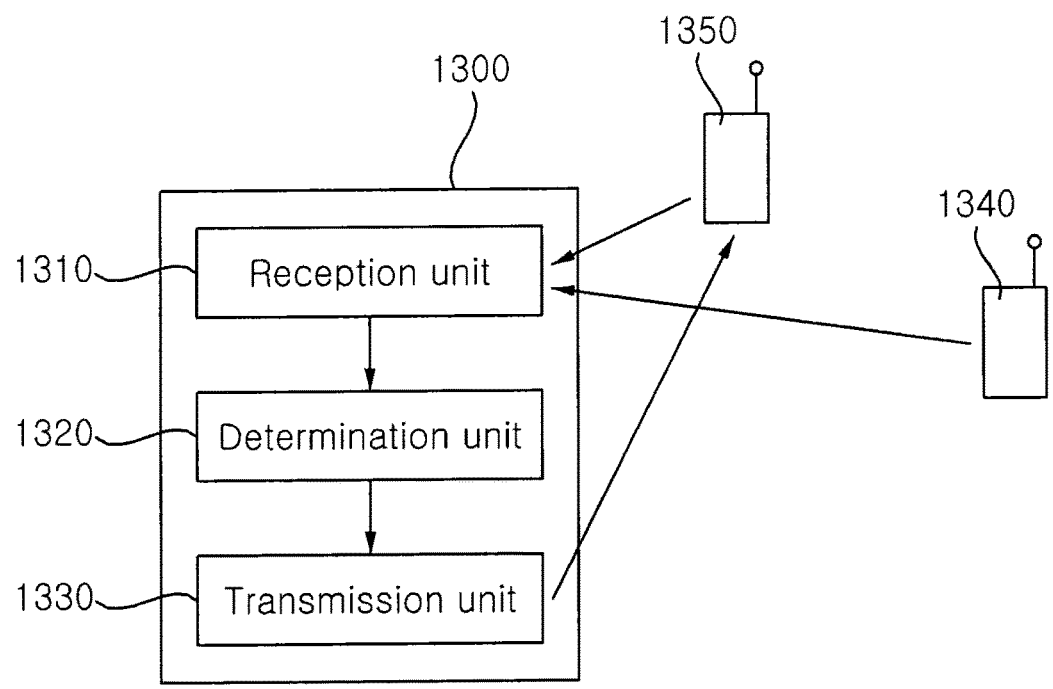
FIG. 13 is a block diagram illustrating the configuration of a member device that restores a damaged multicast group.

FIG. 13 is a block diagram illustrating the configuration of a member device that restores a damaged multicast group.

The member device 1300 according to an exemplary embodiment includes a reception unit 1310, a determination unit 1320, and a transmission unit 1330.

The reception unit 1310 receives information about a multicast group from another member device included in the multicast group. In accordance with an aspect of the present invention, the reception unit 1310 may receive the information about the multicast group periodically or non-periodically. Furthermore, the information about the multicast group may be included and received in a multicast group notification frame (MGNF).

If the reception unit 1310 is unable to receive information about a multicast group from another member device included in the multicast group, the determination unit 1320 may determine that the multicast group including the member device 1300 has been damaged. The damage of the multicast group also includes a case where some of member devices included in the multicast group have withdrawn from the multicast group.

If it is determined that the multicast group has been damaged, the transmission unit 1330 may send restoration information about the multicast group to a second member device 1350 included in the multicast group. In accordance with an aspect of the present invention, the restoration information about the multicast group may be included and sent in an advertisement command frame (ACF). In accordance with an aspect of the present invention, the restoration information may include the identifier of a service that the member device 1300 desires to use.

The second member device 1350 may receive the restoration information and determine a service that the member device 1300 desires to use. If the second member device 1350 is able to provide the corresponding service, the second member device 1350 may determine the multicast group in which the second member device 1350 and the member device 1300 are included. In this case, the second member device 1350 may send a response to the restoration information to the member device 1300.

The reception unit 1310 may receive the response to the restoration information from the second member device 1350. The reception unit 1310 may restore the multicast group using the received response.

In accordance with an aspect of the present invention, the reception unit 1310 may receive the information about the multicast group from the second member device 1350 included in a second multicast group. The determination unit 1320 may estimate a damaged location with reference to the location of a device, from which information about a multicast group has been received, and the topology of the multicast group.

For example, if the reception unit 1310 has received the information about the multicast group from the second member device 1350, but has not received the information about the multicast group from a withdrawing device 1340, the determination unit 1320 may determine that the location between the second member device 1350 and the withdrawing device 1340 has been damaged.

In accordance with an aspect of the present invention, the determination unit 1320 may set a timer depending on a damaged location. The timer may be set as a value proportional to the distance between the damaged location and the member device 1300 or the number of hops between the damaged location and the member device. Accordingly, in the embodiment illustrated in FIG. 13, the timer of the second member device 1350 is set to a smaller value than the timer of the member device 1300.

When the set timer expires, the transmission unit 1330 may send restoration information about the multicast group. In the embodiment illustrated in FIG. 13, the timer of the second member device 1350 first expires because the timer of the second member device 1350 is set to a smaller value. Accordingly, the second member device 1350 sends the restoration information to the member device 1300. The member device 1300 that has received the restoration information sends a response to the restoration information to the second member device 1350.

In accordance with the embodiment illustrated in FIG. 13, a device close to a damaged location first sends restoration information for restoring damage. Accordingly, restoration information may be prevented from being redundantly sent, and a plurality of devices may be managed so that they do not individually restore multicast groups.

In accordance with an aspect of the present invention, the restoration information may be set such that it is sent from the member device 1300 only up to a wireless device within a K-hop distance.

A method in accordance with at least one embodiment of the present invention may be implemented in the form of program instructions that can be executed by a variety of computer means, and may be stored in a computer-readable storage medium. The computer-readable storage medium may include program instructions, a data file, and a data structure solely or in combination. The program instructions that are stored in the medium may be designed and constructed particularly for the present invention, or may be known and available to those skilled in the field of computer software. Examples of the computer-readable storage medium include magnetic media such as a hard disk, a floppy disk and a magnetic tape, optical media such as CD-ROM and a DVD, magneto-optical media such as a floptical disk, and hardware devices particularly configured to store and execute program instructions such as ROM, RAM, and flash memory. Examples of the program instructions include not only machine language code that is constructed by a compiler but also high-level language code that can be executed by a computer using an interpreter or the like. The above-described hardware components may be configured to act as one or more software modules that perform the operation of the present invention, and vice versa.

While the present invention has been described in conjunction with specific details, such as specific configuration elements, and limited embodiments and diagrams above, these are provided merely to help an overall understanding of the present invention, the present invention is not limited to these embodiments, and various modifications and variations can be made from the above description by those having ordinary knowledge in the art to which the present invention pertains.

Therefore, other implementations, other embodiments and equivalents to the claims fall within the scope and spirit of the present invention.

INDUSTRIAL APPLICABILITY

In accordance with the embodiments, a multicast group can be managed within a wireless network.

In accordance with the embodiments, a damaged multicast group can be restored in a wireless network.

What is claimed is:

1. A wireless device included in a first multicast group in which data is directly sent between member devices or data is sent using hopping between the member devices, the wireless device comprising:
   a receiver configured to receive a join request for joining a second multicast group from a joining device that attempts to join the second multicast group;
   a processor circuitry configured to:
      extract information about the second multicast group from the join request; and
      determine whether the second multicast group is identical with the first multicast group based on the information about the second multicast group; and
   a transmitter configured to forward the join request to another device or send a response to the join request to the joining device based on a result of the determination,
   wherein the transmitter is further configured to send the response to the join request to the joining device if the second multicast group is identical with the first multicast group;
   the transmitter is further configured to send a redundant transmission prevention message to a second member device included in the second multicast group; and
   the redundant transmission prevention message is used to prevent the second member device from sending a response to the join request to the joining device even if the join request has been sent to the second member device.

2. The wireless device of claim 1, wherein:
   the processor circuitry is further configured to determine a number of hops from the joining device to the wireless device; and
   the transmitter is further configured to discard the join request if the determined number of hops is larger than a predetermined number.

3. A joining device attempting to join a first multicast group in which data is directly sent between member devices or data is sent using hopping between the member devices, the joining device comprising:
   a transmitter configured to send a join request for joining the first multicast group to a member device included in a second multicast group; and
   a receiver configured to receive a response to the join request from the member device if the first multicast group is identical with the second multicast group;
   wherein whether the first multicast group is identical with the second multicast group is determined by comparing information about the first multicast group, extracted from the join request, with information about the second multicast group; and
   wherein the join request is sent to another device if the first multicast group is not identical with the second multicast group;
   a redundant transmission prevention message is sent from the member device to another member device included in the second multicast group if the first multicast group is identical with the second multicast group; and
   the redundant transmission prevention message is used to prevent the another member device from sending a response to the join request to the joining device even if the join request has been sent to the another member device.

4. The joining device of claim 3, wherein the join request is discarded if a number of hops from the joining device to the member device is larger than a predetermined number.

5. A member device included in a multicast group, the member device comprising:
- a processor circuitry configured to determine that the multicast group has been damaged if information about the multicast group has not been received from a withdrawing device included in the multicast group for a specific time;
- a transmitter configured to send restoration information about the multicast group to a second member device included in the multicast group based on a result of the determination; and
- a receiver configured to:
  - receive a response to the restoration information from the second member device; and
  - restore the multicast group using the response,
  - receive the information about the multicast group from the second member device included in the multicast group; and
- the processor circuitry is further configured to:
  - estimate a damaged location based on the information about the multicast group received from the second member device and the withdrawing device; and
  - set a timer based on a result of the estimation.

6. The member device of claim 5, wherein the information about the multicast group is included and received in a multicast group notification frame (MGNF).

7. The member device of claim 5, wherein the transmitter sends the restoration information about the multicast group when the set timer expires.

8. The member device of claim 5, wherein the timer is set to a value proportional to a distance between the damaged location and the member device or a number of hops between the damaged location and the member device.

9. The member device of claim 5, wherein the restoration information about the multicast group is included and sent in an advertisement command frame (ACF).

10. The member device of claim 9, wherein the advertisement command frame is sent only up to a wireless device spaced apart from the member device by a predetermined number of hops.

* * * * *